United States Patent [19]

Forin

[11] Patent Number: 5,360,640
[45] Date of Patent: Nov. 1, 1994

[54] PROCESS FOR PRINTING BY MARKING A SUBSTRATE BASED ON GLASS FIBERS AND NOVEL SUBSTRATE OBTAINED

[75] Inventor: Roger G. Forin, Vieugy, France

[73] Assignee: Societe Anonyme: Hexcel-Genin, France

[21] Appl. No.: 780,989

[22] Filed: Oct. 24, 1991

[30] Foreign Application Priority Data

Oct. 24, 1990 [FR] France ................... 90 13415

[51] Int. Cl.⁵ ................... B05D 5/00; B05D 3/12
[52] U.S. Cl. ................... 427/278; 427/366; 427/370; 427/389.8; 156/220; 428/187
[58] Field of Search ............ 427/278, 366, 370, 389.8; 156/220; 428/187

[56] References Cited

U.S. PATENT DOCUMENTS

| | | | |
|---|---|---|---|
| 3,776,751 | 12/1973 | Davis et al. | 427/366 |
| 4,205,108 | 5/1980 | Schmidt et al. | 427/245 |
| 4,229,400 | 10/1980 | Laurie | 427/389.8 |
| 4,268,577 | 5/1981 | Fahey | 427/389.8 |
| 5,093,158 | 3/1992 | Li et al. | 427/278 |

FOREIGN PATENT DOCUMENTS

| | | |
|---|---|---|
| 1482151 | 5/1967 | France . |
| 816805 | 8/1951 | Germany . |
| 2817566 | 10/1978 | Germany . |
| 3436065 | 4/1986 | Germany . |
| 60-141526 | 7/1985 | Japan . |

*Primary Examiner*—George F. Lesmes
*Assistant Examiner*—B. Copenheaver
*Attorney, Agent, or Firm*—Bacon & Thomas

[57] ABSTRACT

This invention relates to the marking of substrates based on glass fibers. The process consists in coating at least in part at least one of the faces of said substrate with a film of heat-fusible material and in making matt imprints on the surface of said film at least by localized hot creeping of said heat fusible material. The invention is more particularly applicable to webs of textile cloth used as light-diffusing and/or attenuating screens.

5 Claims, No Drawings

10

PROCESS FOR PRINTING BY MARKING A SUBSTRATE BASED ON GLASS FIBERS AND NOVEL SUBSTRATE OBTAINED

FIELD OF THE INVENTION

The present invention relates to a process for printing by marking a substrate based on glass fibers and to a novel substrate obtained.

It relates to products based on glass fibers and concerns more particularly those products that are to be individualized or personalized at least locally by one or more visually perceptible prints.

The invention concerns more specifically, by way of preferred but non-limiting application, substrates in the form of a textile web more or less translucent by the nature of the material, its internal coloration or its texture, on which decorative prints are to be applied as a function of their future applications by way of light screen, attenuation, diffusion or decorative coating.

Substrates of the above type are frequently used in the form of sheets, webs or bands to constitute screens, curtains or light-diffusing or -attenuating panels or decorative coatings.

With a view to breaking up the uniformity presented by such products, it has been envisaged to colour them in uniform shades. Such coloration cannot be considered as contributing a decorative print which is particularly sought-after.

In order to overcome this drawback, it has been recommended to weave these textile webs so as to show either weaves or patterns resulting from a particular, localized, specific interlacing of certain fibers or strands.

A large variety of patterns have thus been obtained, but the aesthetic and decorative appearance procured does not appear certain, clear, distinct and in any case the possible patterns are limited by the unavoidable servitude of the technical possibility of interlacing of the strands, filaments or fibers.

In order to obtain varied patterns, such a servitude raises problems of difficulties in production, and even impossibilities, and, in the case of feasability, is translated by a considerable increase in the cost price per surface unit or length.

It is an object of the present invention to overcome the above drawbacks by proposing a novel process for printing substrates based on glass fibers, a novel process making it possible to obtain, at an advantageous cost price, a considerable richness and variety of patterns or prints, decorations, identifications or personalizations capable of presenting, in addition, a certain aesthetic and decorative appearance.

SUMMARY OF THE INVENTION

To attain the objects set forth hereinabove, the process for printing a substrate based on glass fibers is characterized in that it consists in coating, at least in part, at least one of the faces of said substrate with a film of heat fusible material and in making, on the surface of said film, matt imprints at least by localized hot creeping of said heat-fusible material.

The invention also relates to a novel substrate based on glass fibers, characterized in that it comprises at least locally, on at least one of its faces, a film of heat-fusible material presenting on the surface localized matt imprints.

The process of the invention is described hereinafter in its preferred application to the printing of substrates in the form of a textile web made from glass fibers, in accordance with a known technique which does not form part of the invention. Such textile webs present, generally by the choice of the constituent material or the weave, a more or less great translucency, with a view to being used principally as light-diffusing or -attenuating panel or screen.

It goes without saying that the object of the invention can be implemented for any other type of substrate, at least in part based on glass fibers, whether it be supple, flexible, compact, of small or large thickness.

The process according to the invention consists in coating, at least in part, at least one of the faces of the substrate with a film of heat-fusible material of transparent, translucent or slightly coloured nature. The film is deposited in any suitable manner compatible with the nature of the substrate. A particularly suitable process in the case of substrates in the form of a supple or relatively supple textile web is the deposit by coating, by continuously advancing passage in a coating bath or vat containing a liquid solution of the heat-fusible material chosen. Deposit by lining may also be envisaged. Among the numerous possibilities offered by the technique of plastics materials, a particularly suitable material for coating or for constituting the film is polyvinyl chloride, although an acrylic material may also be satisfactorily employed.

The addition or deposit of the film of heat-fusible material is effected at a rate of at least 6% by weight of dry extracts of said material with respect to the weight of the substrate, and preferably from 8 to 35%.

Deposit of the film is effected according to the conventional conditions for the film to adhere firmly and in resistant manner to the substrate on which it is fixed by polymerization or hardening, generally by heat.

After the above preparatory phase has been accomplished, the substrate is subjected to hot marking so as to produce marks, on the surface of the film, at least by localized hot creeping of the heat-fusible material which, after cooling, leaves smooth, matt imprints apparent, corresponding exactly in shapes and contours to the positive impression or impressions of the marking tool used which, of course, may be plane or of revolution.

Hot marking is effected by temporarily applying a temperature of between 60° and 200° C. and by exerting, by the marking tool, a pressure close to $5.10^5 p$ on the film of heat-fusible material.

The hot marking operation may be carried out via a press or by a process of continuous advance of the substrate between a heating marker cylinder and a support cylinder whose periphery is in that case advantageously provided with a compressible coating such as clastomer presenting a Shore hardness of 60 to 90. In such a case, the cylinders are driven synchronously in opposite rotations so as to cause the substrate to advance at a speed which may be included between 2 and 20 meters per minute. In such a case, the pressure exerted on the substrate by the two cylinders is adjusted so that about 5 to 15 tons intervene over the axial length of contact between the generatrices of the cylinders.

In all cases, the operational conditions of pressure and of temperature are retained as a function of the heat-fusible material constituting the film, so that hot marking produces, by the impression of the marking tool, at least a softening of the surface of the heat-fusible material, promoting at least a surface creeping, translated, after cooling, by the indelible existence of a mark, generally of opacifying character, presenting a smooth surface state which may thus be easily appreciated visually with respect to the general state of the film, whether the latter be visually perceptible directly or indirectly, by reason of its translucency, its small thickness or the absence of contrasts that it presents with respect to the glass fibers constituting the subjacent substrate.

The imprints thus made are visually perceptible directly and even more so by the effect of transparency when the substrate, preferably of the type retained hereinbefore, is interposed between an observer and a source of light.

Experiments carried out have enabled very good results to be obtained on webs of coloured, woven textile fabric worked for the purpose of constituting light-diffusing or attenuating screens, implementing the parameters set forth hereinbelow.

EXAMPLE 1

A substrate of the textile sheet type, based on glass fibers of 165 g/m$^2$ woven in a cloth weave, was coated on at least one of its faces with a film of polyvinyl chloride, at a rate of 30% by weight of dry extracts with respect to the weight of the substrate.

Such a substrate was treated by continuously advancing between support and heating/printing cylinders rotating in opposite directions at synchronous speeds, at 10 meters per minute.

The heating marker cylinder was maintained at a temperature equal to 130° C. and exerted on the substrate a pressure of 10 tons over 160 centimetres of axial length of cylinder.

Long-lasting imprints of continuous and/or discontinuous patterns were obtained on the surface of the film without altering the latter nor distorting or degrading the substrate, such imprints being characterized by a smooth surface and a partial localized opacification limited exactly to the contours of the imprint or imprints of the heating marker cylinder.

EXAMPLE 2

The same substrate was treated as in Example 1, but employing a temperature of 80° C., the same pressure and a speed of 5.5 meters per minute.

In both cases, imprints of generally matt appearance comprising a smooth surface and a generally opacifying character were made precisely, in extremely varied patterns, presenting a resistance to ageing without any alteration of the film or of the substrate having been considered or ascertained.

The invention also relates to the novel product obtained which is characterized by a substrate based on glass fibers whether it be compact, supple or flexible or made in the form of a textile fabric, of any weave, whose texture gives a more or less accentuated character of transparency. Such a novel product is characterized by the existence on the surface, on at least one of the faces of the substrate, of imprints resulting from a hot marking having modified the state of the heat-fusible material, to the point of showing smooth, matt marks of opacifying character in the more particular case of employing a heat-fusible material of translucent character added to a substrate of transparent character.

The invention is not limited to the examples described, as various modifications may be made thereto without departing from its scope.

What is claimed is:

1. A process for printing on faces of a textile substrate which includes glass fibers,
   comprising the following steps of:
   coating at least in part at least one of the faces of said substrate with a film of heat-fusible polymeric material, wherein the film of heat-fusible material is added at a rate of at least 6% by weight of dry extracts with respect to the weight of the substrate, and
   making matt imprints on a surface of said film by a process including localized hot creeping of the heat-fusible material, wherein the imprints are made by locally applying a temperature of between 60° to 200° C., and by applying pressure to a marking tool.

2. The process of claim 1, wherein a film of at least translucent heat-fusible material is added and opacified matt imprints are made at least by hot creeping.

3. The process of claim 1, wherein the imprints are made by applying to the marking tool a pressure of approximately to $5.10^5$p.

4. The process of one of claim 1, wherein the imprints are made by continuously advancing the substrate between a heating marker cylinder and a support cylinder and the cylinders are driven synchronously in opposite directions to cause the substrate to advance at a speed of 2 to 20 meters per minute.

5. The process of claim 4, wherein the cylinders exert on the substrate a pressure of between 5 and 15 tons applied over an axial length of cylinder close to 160 centimeters.

* * * * *